United States Patent
Andersson et al.

(10) Patent No.: US 12,531,987 B2
(45) Date of Patent: *Jan. 20, 2026

(54) DEBLOCKING OF VIDEO PICTURE BOUNDARIES

(71) Applicant: Telefonaktiebolaget LM Ericsson (publ), Stockholm (SE)

(72) Inventors: Kenneth Andersson, Gävle (SE); Rickard Sjöberg, Stockholm (SE); Jacob Ström, Stockholm (SE); Zhi Zhang, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/817,928

(22) Filed: Aug. 28, 2024

(65) Prior Publication Data

US 2025/0063163 A1 Feb. 20, 2025

Related U.S. Application Data

(63) Continuation of application No. 18/356,359, filed on Jul. 21, 2023, now Pat. No. 12,108,038, which is a
(Continued)

(51) Int. Cl.
| | |
|---|---|
| H04N 7/12 | (2006.01) |
| G06T 9/00 | (2006.01) |
| H04N 19/117 | (2014.01) |
| H04N 19/119 | (2014.01) |
| H04N 19/12 | (2014.01) |
| H04N 19/159 | (2014.01) |
| H04N 19/172 | (2014.01) |

(Continued)

(52) U.S. Cl.
CPC ............ *H04N 19/117* (2014.11); *G06T 9/004* (2013.01); *H04N 19/119* (2014.11); *H04N 19/12* (2014.11); *H04N 19/159* (2014.11); *H04N 19/172* (2014.11); *H04N 19/176* (2014.11); *H04N 19/189* (2014.11); *H04N 19/61* (2014.11); *H04N 19/635* (2014.11); *H04N 19/86* (2014.11)

(58) Field of Classification Search
CPC ............................. G06T 9/004; H04N 19/117
See application file for complete search history.

(56) References Cited

U.S. PATENT DOCUMENTS

| | | | |
|---|---|---|---|
| 10,237,553 B2 | 3/2019 | Sasai et al. | |
| 2015/0264406 A1 | 9/2015 | Kim et al. | |

FOREIGN PATENT DOCUMENTS

| | | |
|---|---|---|
| CN | 102835114 A | 12/2012 |
| CN | 103220529 A | 7/2013 |

(Continued)

OTHER PUBLICATIONS

Andersson, K. et al.: "CE2-2.1.1: Long deblocking filters and fixes", JVET-K0307-v1 (11th Meeting, Jul. 10-18, 2018) (JVET and ISO/IEC JTC1/SC29/WG11), 6 pages.

Chen, J. et al.: "Algorithm description for Versatile Video Coding and Test Model 1 (VTM 1)", JVET-J1002-v2 (10th Meeting, Apr. 10-20, 2018) (JVET and ISO/IEC JTC1/SC29/WG11), 9 pages.

Norkin, A. et al.: "HEVC Deblocking Filter," IEEE Transactions on Circuits and Systems for Video Technology, vol. 22, No. 12, Dec. 2012, pp. 1746-1754, 9 pages.

*Primary Examiner* — Young Lee
(74) *Attorney, Agent, or Firm* — Rothwell, Figg, Ernst & Manbeck, P.C.

(57) ABSTRACT

Methods and apparatuses for applying a deblocking to a coding unit in video pictures a provided. In one aspect, the deblocking is applied to sub-block boundaries in the coding unit and to implicit transform unit boundaries in the coding unit.

16 Claims, 16 Drawing Sheets

Related U.S. Application Data continuation of application No. 17/836,856, filed on Jun. 9, 2022, now Pat. No. 11,758,131, which is a continuation of application No. 16/494,158, filed as application No. PCT/EP2019/066349 on Jun. 20, 2019, now Pat. No. 11,388,400.

(60) Provisional application No. 62/688,085, filed on Jun. 21, 2018.

(51) Int. Cl.
*H04N 19/176* (2014.01)
*H04N 19/189* (2014.01)
*H04N 19/61* (2014.01)
*H04N 19/635* (2014.01)
*H04N 19/86* (2014.01)

(56) References Cited

FOREIGN PATENT DOCUMENTS

CN 106105201 A 11/2016
WO 2017/157249 A1 9/2017

OTHER PUBLICATIONS

Sjoberg, R. et al.: "Description of SDR and HDR video coding technology proposal by Ericsson and Nokia", JVET-J0012-v1 (10th Meeting, Apr. 10-20, 2018 (JVET and ISO/IEC JTC1/SC29/WG11), 32 pages.

Chen, J. et al.: "Algorithm description of Joint Exploration Test Model 7 (JEM 7)", JVET-G1001-v1 (7th Meeting, Jul. 13-21, 2017) (JVET and ISO/IEC JTC 1/SC 29/WG 11), 48 pages.

Sjoberg, R. et al. "Description of SOR and HOR video coding technology proposal by Ericsson and Nokia", Joint Video Exploration Team (JVET), of ITU-T SG 16 WP 3 and ISO/IEC JTC1/SC29/WG11, 10th Meeting, Apr. 10-20, 2018, [JVET-J0012-v1] (version 2), pp. 8-12.

```
filterMvSubBlocks = false;

if (currPU.mergeFlag && (currPU.mergeType != MRG_TYPE_DEFAULT_N))
{
    filterMvSubBlocks = true;
    // find prediction sub-block boundaries
    if (edgeDir == EDGE_HOR)
    {
        for (UInt off = pcv.minCUHeight; off < areaPu.height; off += pcv.minCUHeight)
        {
            xSetEdgefilterMultipleSubPu(cu, EDGE_HOR, areaPu,
areaPu.offset(0, (PosType)off), m_stLFCUParam.internalEdge);
        }
    }
    else
    {
        for (UInt off = pcv.minCUWidth; off < areaPu.width; off += pcv.minCUWidth)
        {
            xSetEdgefilterMultipleSubPu(cu, EDGE_VER, areaPu,
areaPu.offset((PosType)off, 0), m_stLFCUParam.internalEdge);
        }
    }
} implicitTU = false;

// Check if height is larger than the maximum transform size, since
128 is the maximum CU height only one implicit split is required. If that
is the case an implicit TU boundary (a boundary between B1 and B2) can
occour 64 samples from the upper horizontal CU boundary
if ((cu.blocks[COMPONENT_Y].height > 64) && (edgeDir == EDGE_HOR))
{
    implicitTU = true;
}
    // Check if width is larger than the maximum transform size 64,
since 128 is the maximum width only one implicit skip is required. If that
is the case an implicit TU boundary (a boundary between B1 and B2) can
occour 64 samples from the left vertical CU boundary
if ((cu.blocks[COMPONENT_Y].width > 64) && (edgeDir == EDGE_VER))
{
    implicitTU = true;
}
```

FIG. 8A

```
  doInternalEdgeFilter = false;
  startInternalEdge=1;uiOrtogonalIncrement=1;uiOrtogonalLength =1;
  if (filterMvSubBlocks)
  {
    doInternalEdgeFilter = true;
    uiOrtogonalLength = (edgeDir == EDGE_HOR) ?
cu.blocks[COMPONENT_Y].height / 4 : cu.blocks[COMPONENT_Y].width / 4;
  }
  else
  {
    if ((cu.blocks[COMPONENT_Y].height > 64) && (edgeDir == EDGE_HOR))
    {
      doInternalEdgeFilter = true;
      uiOrtogonalIncrement = 64 / 4;
      uiOrtogonalLength = cu.blocks[COMPONENT_Y].height / 4;
      startInternalEdge = uiOrtogonalIncrement;
    }
    if ((cu.blocks[COMPONENT_Y].width > 64) && (edgeDir == EDGE_VER))
    {
      doInternalEdgeFilter = true;
      uiOrtogonalIncrement = 64 / 4;
      uiOrtogonalLength = cu.blocks[COMPONENT_Y].width / 4;
      startInternalEdge = uiOrtogonalIncrement;
    }
  }
}

// first filtering boundaries inside CU (boundary C) then implicit TU
boundary between B1 and B2
iEdge equal to 0 corresponds to CU boundary    //xEdgeFilterLuma
process a CU boundary when iEdge is equal to 0, edgeDir is either a
horizontal boundary (EDGE_HOR) or a vertical boundary (EDGE_VER)

if(doInternalEdgeFilter)
{
    // first filter inside CU except implicit TU boundary
    for (int iEdge = startInternalEdge; iEdge < uiOrtogonalLength; iEdge
+= uiOrtogonalIncrement)
    {
       if(!(implicitTU && (iEdge== 64 / 4)))
       {
          xEdgeFilterLuma(cu, edgeDir, iEdge);
       }
    }

// then filter implicit TU boundary
    if(implicitTU)
    {
       xEdgeFilterLuma(cu, edgeDir, 64 / 4);
    }
}
```

FIG. 8B

DEBLOCKING OF VIDEO PICTURE BOUNDARIES

CROSS REFERENCE TO RELATED APPLICATION(S)

This application is a Continuation of U.S. application Ser. No. 18/356,359, filed on Jul. 21, 2023, which is a Continuation of U.S. application Ser. No. 17/836,856, filed on Jun. 9, 2022, (now U.S. Pat. No. 11,758,131), which is a Continuation of U.S. application Ser. No. 16/494,158, filed on Sep. 13, 2019, (now U.S. Pat. No. 11,388,400), which is a 35 U.S.C. § 371 National Stage of International Patent Application No. PCT/EP2019/066349, filed Jun. 20, 2019, designating the United States and claiming priority to U.S. Provisional Application No. 62/688,085, filed on Jun. 21, 2018. The above-identified applications are incorporated by reference in their entirety.

TECHNICAL FIELD

This disclosure relates to apparatuses and methods for video processing. Some aspects of this disclosure relate to apparatuses and methods for encoding, decoding, and/or filtering a video picture that has been partitioned into one or more coding blocks.

BACKGROUND

A video sequence consists of a series of images where each image consists of one or more components. Typically, each component can be described as a two-dimensional rectangular array of sample values. It is common that an image in a video sequence consists of three components: one luma component (Y), where the sample values are luma values, and two chroma components (Cb, Cr), where the sample values are chroma values. Other examples components can include Y', CbCr, Yuv, and $IC_TC_P$. For $IC_TC_P$, the "I" is referred to as an "intensity luma" component. In the context of the current disclosure, a luma component (e.g., Y', Y or I) may simply be referred to as Y or luma in a given example. Additionally, it is often the case that the dimensions of the chroma components are smaller than the luma components. For instance, they may be smaller by a factor of two in each dimension. For example, the size of the luma component of an HD image may be 1920×1080 and the chroma components may each have the dimension of 960×540. Components are sometimes referred to as color components.

For video coding, an image can be split into units, each of which covers a specific area of the image. Each unit may consist of blocks from each of the components that make up that specific area, where each block is completely included in the unit. The macroblock in H.264 and the Coding Unit (CU) in HEVC are examples of such units. In this instance, a block may be understood as one two-dimensional array of samples. Often in video coding, each component is split into such blocks, and the coded video bitstream thus comprises a series of blocks.

In HEVC, each picture is partitioned into coding tree units (CTU). A CTU in HEVC consists of an N×N block of luma samples and two corresponding M×M chroma blocks. A CTU in HEVC is like macroblocks in H.264 and earlier standards, but in contrast to macroblocks, the size of the CTU is configurable. In most instances, however, the CTU size in HEVC is set to 64×64 luma samples. Each CTU can be recursively quadtree split, and the root of the quadtree is then associated with the CTU. The quadtree is split until a leaf is reached, which is referred to as the Coding Unit (CU).

A CU in HEVC always consist of a luma block with equal height and width. Information regarding how each CTU is split is conveyed in the bitstream. Furthermore, the CU is the root node of two other trees-a prediction tree comprising prediction units (PUs) as nodes, and a transform tree comprising transform units (TUs) as nodes. Some decoding processes are performed on the CU level, the PU level, and the TU level. Boundaries between adjacent PUs and boundaries between adjacent TUs are filtered by a deblocking filter to reduce discontinuities between TUs and PUs. In HEVC, there are two kinds of prediction types for a PU: (1) intra-prediction which only uses prediction from previously decoded samples of the current picture for prediction and (2) inter-prediction which uses prediction from at least one previously decoded picture. In HEVC, deblocking is first applied on vertical boundaries and then on horizontal boundaries. The boundaries are either TU boundaries or PU boundaries. To enable parallel friendly deblocking, the deblocking is performed on an 8×8 sample grid.

In HEVC, a deblocking filter strength parameter (bs) is set for each boundary. If the value of bs for a boundary is larger than 0, then deblocking may be applied to the boundary. The strength of the applied filtering depends on how large the boundary strength is. For example, in a first step is it checked whether any of the blocks at a PU boundary between the blocks is an intra predicted block. If the PU boundary between the blocks is an intra predicted block, the deblocking filter strength parameter for the PU boundary is set to 2 (e.g., the bs is set to 2). If both blocks use inter prediction, but the blocks use different reference frames or have significantly different motion vectors, the deblocking filter strength parameter for the PU boundary is set to 1 (e.g., the bs is set to 1). It is also checked whether a TU boundary between the blocks has non-zero transform coefficients in at least one of the blocks (e.g., code block flag CBF equal to 1). If so, then the deblocking filter strength parameter for the TU boundary is set to 1 (e.g., the bs is set to 1).

Accordingly, in HEVC it is first checked whether a boundary strength (bs) is larger than 0 to determine whether deblocking should be applied. To reduce and/or avoid removing natural structures when deblocking, it is checked whether there are any natural structures on respective sides of the boundary for luma. In HEVC, gradient calculations are used on respective sides of the boundary using the following inequality: abs (p0−2*p1+p2)+abs (q0−2*q1+q2) <beta, where beta is a parameter based on the quantization parameter for the block and p0, p1, to p2 are samples on one side of the block boundary and q0, q1, to q2 are samples on the other side of the block boundary. The condition is checked at two positions along the boundary, and if both conditions are fulfilled, then the luma samples are deblocked for that sample part of the boundary. Chroma boundaries may always be filtered if one any of the neighbouring blocks are intra coded.

There remains a need for improved video processing at boundaries, such as deblocking filtering.

SUMMARY

According to embodiments, there is provided a decoder for decoding a video picture that has been partitioned into one or more coding blocks. The method includes, for a coding block of the video picture having a size greater than a maximum transform size N, splitting the coding block into at least a first transform block and a second transform block, thereby forming a first transform boundary between the first and second transform blocks. This may be, for example, an implicit split. In some embodiments, the decoder may determine that the size is greater than the maximum N. The method also includes splitting a portion of the coding block into a first prediction sub-block and a second prediction sub-block, thereby generating a first prediction boundary between the first and second prediction sub-blocks, where the first prediction boundary is within the first transform block. The method also includes applying a first deblocking filter to the first prediction boundary, and applying a second deblocking filter to the first transform boundary. The method may also include decoding a transform coefficient for at least one of the first and second blocks and applying an inverse transform operation to the first or second block. In certain aspects, a maximum number of samples modified at the first prediction boundary by the first deblocking filter is different than a maximum number of samples modified at the first transform boundary by the second deblocking filter.

According to embodiments, there is provided a method performed by a decoder for decoding a video picture. The method includes the decoder splitting the luma component of a coding unit into a first block and a second block without decoding any syntax element indicating the split on a block level. The method further includes the decoder decoding at least one transform coefficient for at least one of the first block and the second block, and applying an inverse transform to the at least one of the first block and the second block. The method further includes the decoder splitting the luma component of the coding unit into a plurality of prediction sub-blocks, wherein the plurality of prediction sub-blocks create a boundary in at least one of the first block and the second block. The decoder may then apply a deblocking filter to the boundary in at least one of the first block and the second block. The method can also include the decoder applying the deblocking filter to a boundary between the first block and the second block. In certain aspects, the method may be applied to a chroma component of the coding unit. In some embodiments, the step of splitting the luma component of the coding unit comprises vertically splitting the luma component. In some embodiments, the step of splitting the luma component of the coding unit comprises horizontally splitting the luma component.

According to some embodiments, a decoder is provided that is configured to perform one or more of the methods of decoding a video picture.

According to some embodiments, there is provided a method performed by an encoder for encoding a video picture partitioned into one or more coding blocks. The method includes, for a coding block of the video picture having a size greater than a maximum transform size N, splitting the coding block into at least a first transform block and a second transform block, thereby forming a first transform boundary between the first and second transform blocks. This may be, for example, an implicit split. The method may also include determining that the size is greater than N. The method also includes splitting a portion of the coding block into a first prediction sub-block and a second prediction sub-block, thereby generating a first prediction boundary between the first and second prediction sub-blocks, where the first prediction boundary is within the first transform block. The method may also include applying a first deblocking filter to the first prediction boundary; and applying a second deblocking filter to the first transform boundary. In some embodiments, the method further comprises including at least one transform coefficient in a coded video picture for the first or second block. In certain aspects, a maximum number of samples modified at the first prediction boundary by the first deblocking filter is different than a maximum number of samples modified at the first transform boundary by the second deblocking filter.

According to embodiments, there is provided a method performed by an encoder for encoding a video picture. The method includes the encoder splitting the luma component of a coding unit into a first block and a second block without including any syntax element indicating the split on a block level into the encoded video picture. The method further includes the encoder including at least one transform coefficient into the encoded video picture for at least one of the first block and the second block. The method further includes the encoder splitting the luma component of the coding unit into a plurality of prediction sub-blocks, wherein the plurality of prediction sub-blocks create a boundary in at least one of the first block and the second block. The encoder may then apply a deblocking filter to a boundary in at least one of the first block and the second block. The method can also include the encoder applying the deblocking filter to a boundary between the first block and the second block. In certain aspects, the method may be applied to a chroma component of the coding unit. In some embodiments, the step of splitting the luma component of the coding unit comprises vertically splitting the luma component. In some embodiments, the step of splitting the luma component of the coding unit comprises horizontally splitting the luma component.

According to some embodiments, an encoder is provided that is configured to perform one or more of the methods of encoding a video picture.

According to some embodiments, a computer program product is provided, which comprises a non-transitory computer readable medium storing instructions that when performed by processing circuitry of a video processing device, causes the device to perform one or more the foregoing methods.

According to some embodiments, a video processing device is provided. The device may include a memory and a processor, wherein the processor is configured to perform one or more of the foregoing methods.

The embodiments disclosed herein can provide a significant reduction of discontinuities across implicit TU boundaries, while also reducing discontinuities from sub-blocks inside the block that the implicit TU covers. This can substantially improve the subjective quality. Additionally, embodiments disclosed herein can have the further benefit of the deblocking process being done in parallel, thereby improving efficiency of the video processing.

BRIEF DESCRIPTION OF THE DRAWINGS

The accompanying drawings, which are incorporated herein and form part of the specification, illustrate various embodiments.

FIGS. 8A and 8B illustrate pseudo code according to some embodiments.

DETAILED DESCRIPTION

Aspects of the present disclosure relate to improved video processing, such as encoding, decoding, and filtering. Deblocking can be applied not only at sub-block boundaries, but also at the implicit boundaries of transform units. This may be applied, for instance, with respect to Versatile Video Coding (VVC), in which units may contain implicit divisions, such as with respect to transforms. Embodiments may also be applicable to other compression standards, including other MPEG standards.

In the current draft of the specification for H.266 (VVC draft 1 JVET-J1001v1) (hereinafter referred to as "VVC draft 1"), a coding tree unit (CTU) is similar to the CTU in HEVC, with the difference that the CTU in VVC has a size of 128×128 luma samples. In VVC, the CTU can be split more flexibly such that a resulting CU may comprise a rectangular luma block. Although there is presently no prediction tree as in HEVC for VVC, a CU in VVC can implicitly be divided into a plurality of TUs. The resultant implicit TUs can appear when the CU size has a width or height larger than a maximum transform size. If the CU size does not have a width or height larger than the maximum transform size, the CU likely does not have a prediction tree or a transform tree. Thus, there remains a need for improved processing that can account for TUs when a CU size exceeds a maximum transformation size.

Figure 1:
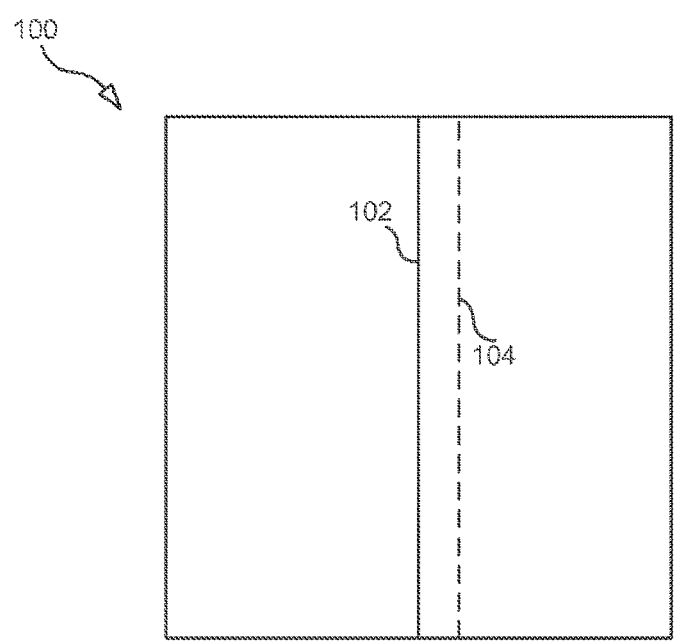
FIG. 1 illustrates a coding unit according to one embodiment.

Further, in VVC, deblocking is first applied on vertical CU boundaries and then on horizontal CU boundaries, and the deblocking is based on HEVC deblocking. A number of sub-block prediction tools have been described in the exploration work of the Joint Video Experts Team (JVET) such as, for instance, FRUC, AFFINE, and MV PREDICTION. A sub-block prediction tool may be, for instance, a prediction tool that has more than one set of motion parameters for different parts of a block, e.g. sub-blocks, but those motion parameters are not transmitted to the decoder but derived from a previous frame or from motion vectors from neighboring coding blocks. Such tools may be included in one or more compression standards (e.g., VVC), and can produce sub-blocks inside a CU. FIG. 1 shows an example of a sub-block boundary 104 close to an implicit TU boundary 102 in a CU 100. Accordingly, there also remains a need for effective deblocking of sub-block boundaries.

Certain embodiments disclosed herein provide a method for video encoding or decoding in which CU or block boundaries due to large implicit splits are filtered by a deblocking filter. In the context of the current disclosure, a large implicit split may indicate a split of a CU or a block that has at least one side that is spatially larger than a set maximum size. The maximum size may be, for example, set to a maximum transform size. For instance, if a set maximum transform size is equal to 64, then any CU or block that has at least one side larger than 64 can be implicitly split into a CU or block with both sides equal to or smaller than 64.

Figure 2:
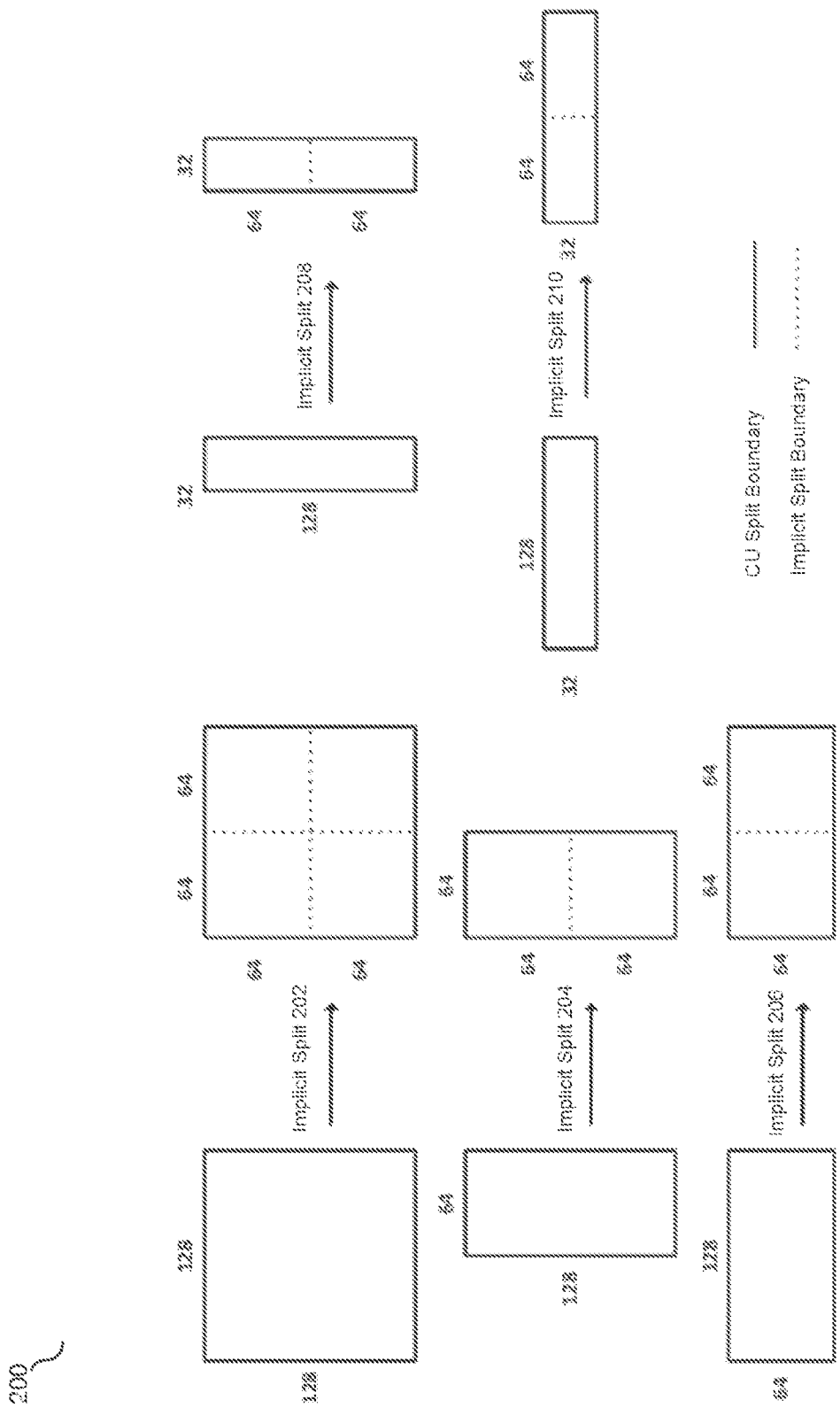
FIG. 2 illustrates split CU or blocks according to some embodiments.

FIG. 2 illustrates a non-exhaustive set of examples 200 where the CU or block before a split has at least one side equal to 128 and the set maximum size is equal to 64, according to some embodiments. According to embodiments, there is a set maximum size equal to N. In this example, for a CU or block with one side larger than N, the CU or block is split on one dimension such that the output CU or block does not have any side larger than N. For a CU or block with both sides larger than N, the CU or block is split along two dimensions such that the output CU or block does not have any side larger than N. In the case when the largest allowed transform size is smaller, for example, 32, a block of 128×64 may first be split along both dimensions, thereby producing four blocks of size 64×32. Each of the four blocks may be further split along one dimension, where each split produces two blocks of size 32×32. Referring to FIG. 2, implicit split 202 splits a 128×128 block into four 64×64 blocks; implicit split 204 splits a 64×128 block into two 64×64 blocks; implicit split 206 splits a 128×64 block into two 64×64 blocks; implicit split 208 splits a 32×128 block into two 64×64 blocks; and implicit split 210 splits a 128×32 block into two 64×64 blocks. In FIG. 2, the implicit boundaries formed by the splits are shown with dash lines, while the boundaries of the CU are shown in solid lines. In some embodiments, an implicit split is one in which there no syntax element or other coding element conveying the split information for the video, while the CU boundaries are defined at the syntax level or otherwise signalled or coded.

In some embodiments, an implicit split is applied as a result of a comparison between the size of the CU or block and the maximum size, without the need for a syntax element conveying the split information regarding an implicit split for a particular block. Instead, the maximum size could for example either be set to a fixed value in a video coding specification, or alternatively signalled in the bitstream according to some embodiments. If the maximum size is signalled in the bitstream, the maximum size is signalled once for multiple CUs or blocks, such as once per video clip, once per set of pictures, once per picture or once per slice.

According to certain aspects, a decoder does not decode or parse any syntax element indicating an implicit split for a particular CU or block. Instead, the decoder derives the split by comparing the size of the particular CU or block with the maximum size indicated in the bitstream or set as a fixed value in the video coding specification. Similarly, an encoder need not encode or signal any syntax element indicating an implicit split for a particular CU or block on the block level. That is, according to embodiments, an encoder does not indicate an implicit split in block level information. Instead, the encoder derives the split by comparing the size of the particular CU or block with the maximum size indicated in the bitstream or set as a fixed value in the video coding specification. Block level information may comprise syntax elements that are sent/encoded and received/decoded on a block-by-block basis. One example of a block level syntax element contained in block level information is a transform coefficient. Another example of a block level syntax element is a delta quantizer value.

In some embodiments, the implicit split may take place after a regular CU split process. The regular CU split may be a split that is part of splitting the CTU into CUs where the split is signalled by one or more syntax elements in the coded video picture on a block-by-block basis.

As an example, a video picture may be partitioned into CTUs of size 128×128. In this instance, the maximum size is assumed to be equal to a value less than the CTU size, for example 64. As an example, when one CTU is decoded, there may one or more syntax elements in the coded video sequence specifying that the CTU should be split into two CUs of size 128×64. According to embodiments, and in this example, there are no syntax elements in the coded video sequence indicating that the CU's need to be split any further. However, since 128 is larger than the maximum size 64, the 128×64 CU is implicitly split into two units of size 64×64, for instance, as illustrated with respect to implicit split 206. In some embodiments, the blocks for each component of the CU may be implicitly split one by one. For example, the luma part of the CU might be a block of size 128×64 and split into two blocks of size 64×64. One chroma part of the CU might be a block of size 64×32 and not implicitly split if one maximum size is used for all components. In some embodiments, a separate maximum size may be specified for chroma (either as one maximum size for all chroma components, or separate maximum size values for each component). For example, the maximum size for chroma may be set to 32. In such embodiments, the chroma block could be further split into 32×32 blocks.

As another example, when another CTU is decoded, there is one or more syntax elements in the coded video sequence specifying that the CTU should be split into three CUs of sizes 128×N, 128×M, and 128×N, where 2*N+M is equal to 128. Example values of N and M are 32 and 64 respectively, such that the CU sizes becomes 128×32, 128×64 and 128×32. In this example, and according to embodiments, there are no syntax elements in the coded video sequence to split any of the CUs further. Each 128×32 CU is then implicitly split into two units of 64×32.and the 128×64 CU is implicitly split into two units of 64×64. Alternatively, the implicit splits are done on blocks, such that the luma blocks of sizes 128×32 and 128×64 are implicitly split into blocks of sizes 64×32 and 64×64 respectively. The chroma blocks may have the sizes of 64×16 and 64×32. If the maximum size for a particular chroma component is equal to 64, no implicit split of the chroma blocks is done. If the maximum size for a particular chroma component is equal to 32, the chroma blocks are split from 64×16 and 64×32 into blocks of sizes 32×16 and 32×32 respectively.

It should be noted that the CTU size 128×128 is merely an example and that a CTU size could be either larger or smaller than that. Likewise, the maximum size could be either larger or smaller than 64. The examples above could use either a horizontal split or a vertical split. Additionally, the regular CU split process could also consist of a series of vertical and horizontal splits, as well as quad splits from a block or unit of size 2N×2N into four blocks or units of size N×N. The vertical or horizontal splits may split one block or unit into 2 or 3 or more blocks or units.

Sub-block splitting can produce sub-blocks inside a CU. According to embodiments, when a coding unit uses a subblock prediction tool the coding block is divided into smaller blocks. For each of the smaller blocks a set of motion parameters are derived from motion parameters from one or more spatially or temporally neighbouring coding blocks and are then used to generate a samples of a prediction subblock. This can introduce blocking artefacts on the boundary between subblocks when the motion parameters in neighbouring sub-blocks differ. Such sub-blocks may be, for instance, down to a size of 4×4 samples. The resultant sub-blocks boundaries can appear close to implicit TU boundaries. Sub-block prediction is one example of how prediction boundaries inside a CU may appear, and may be indicated by a flag. Other causes of prediction boundaries include prediction units (PUs). According to embodiments, filtering may be applied to sub-block boundaries, for instance, near a transform unit boundary. In some embodiments, deblocking of implicit transform boundaries may be performed after filtering of sub-block boundaries. In some embodiments, such filtering may be performed at the same time to achieve the efficiency benefits of parallel processing. For instance, all vertical boundaries (e.g., both transform boundaries and prediction boundaries) may be filtered at one time, and then all horizontal boundaries are filtered after. The process may proceed in the reverse order as well.

Figure 3:
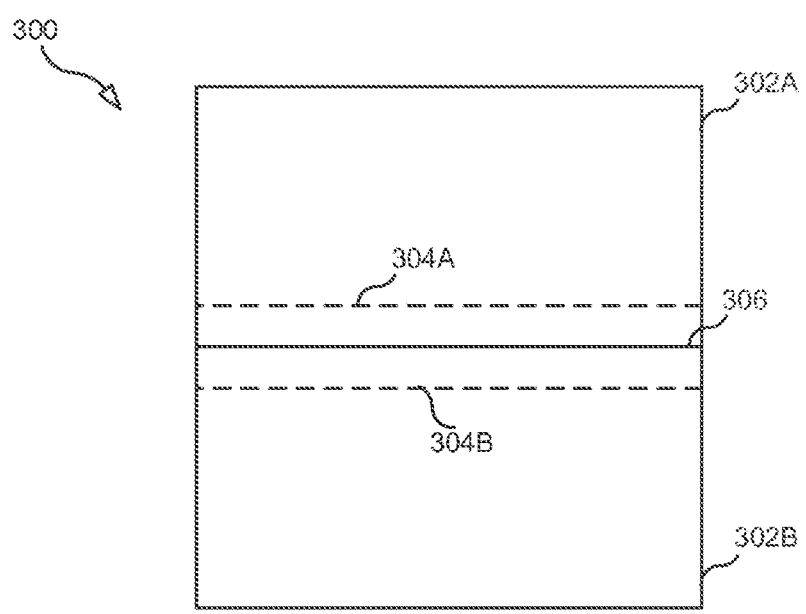
FIG. 3 illustrates a coding unit according to one embodiment.

FIG. 3 illustrates a coding unit 300 according to some embodiments. In some embodiments, a video picture is partitioned into multiple coding units (CUs) including the coding unit 300.

Figure 4:
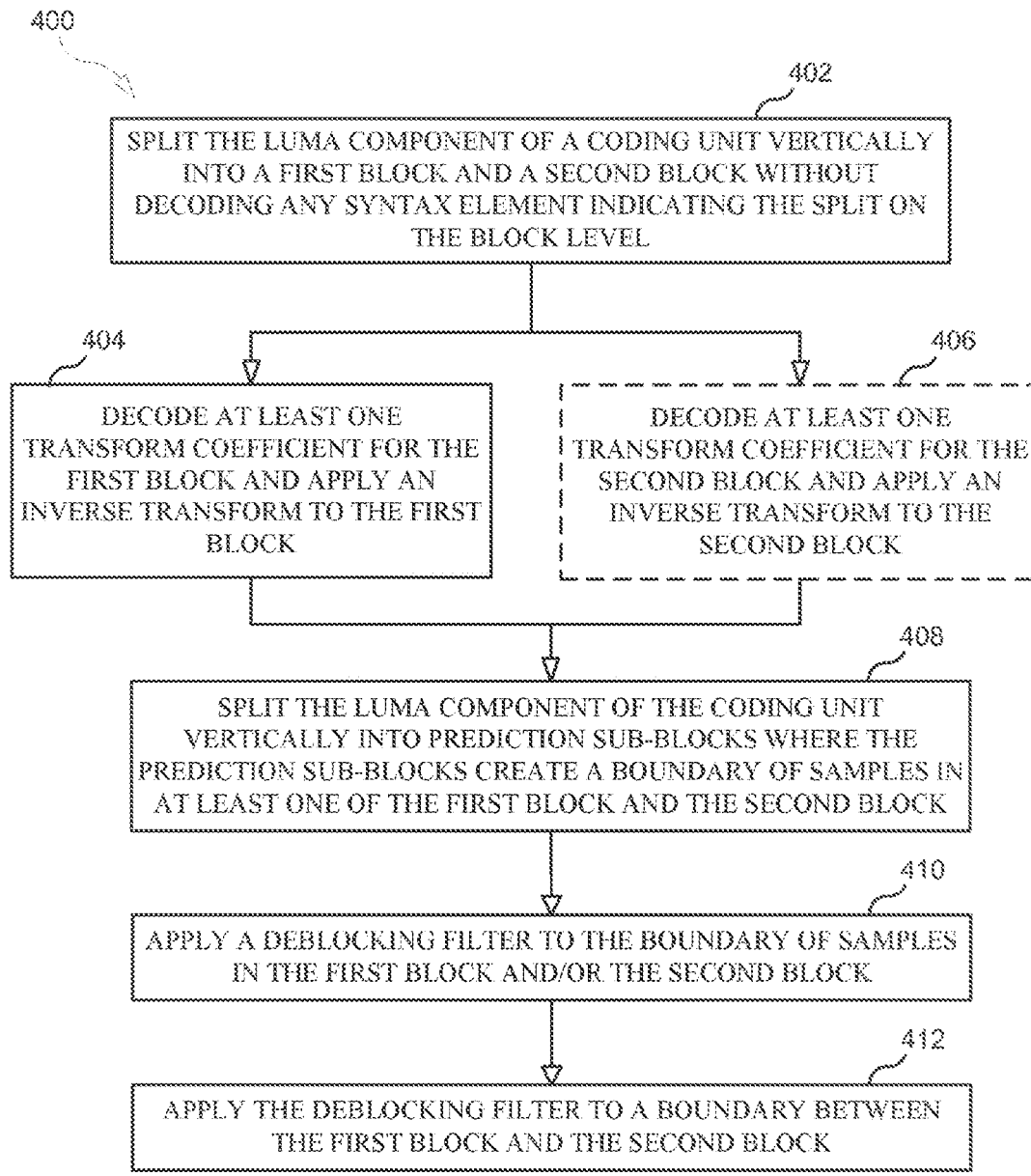
FIG. 4 is a flow chart illustrating a process according to one embodiment.

FIG. 4 is a flow chart illustrating a decoding process 400 with a vertical implicit split according to some embodiments. The process may be, for instance, for a luma component. Though illustrated with respect to the luma component, process 400 may be applied to one or more chroma components. The decoding process 400 may be performed by a decoder and will be described with reference to the coding unit 300 shown in FIG. 3. In some embodiments, a maximum size for a coding unit in the video picture is set equal to an integer value N. In this example, the coding unit 300 has a size of heightY luma samples vertically and width Y luma samples horizontally. In some embodiments, the heightY is larger than N and width Y is equal to or smaller than N. As shown in FIG. 2, other arrangements may also be applied.

The decoding process 400 for decoding the video picture partitioned into multiple CUs may begin with step 402, in which the luma component of coding unit 300 is split vertically into a first block 302A and a second block 302B. This may be performed, for instance, without decoding any syntax element indicating the split on the block level. In some embodiments, each of the first block 302A and the second block 304B comprises Z luma samples vertically and width Y luma samples horizontally, where Z equals the heightY divided by two.

In steps 404 and 406, a transform process is applied. In step 404, at least one coefficient is decoded for the first block 302A and an inverse transform is subsequently applied to the first block 302A. In step 406, which may be an alternative or additional step, at least one transform coefficient is decoded for the second block 302B and an inverse transform is subsequently applied to the second block 302B.

In step 408, the luma component of the CU 300 is split vertically into prediction sub-blocks, where the prediction sub-blocks create a boundary of samples 304A, 304B in at least one of the first block 302A and the second block 302B. In some embodiments, the boundary of samples 304A, 304B inside the first block 302 and/or the second block 302B is located M samples from the boundary 306 between the first block 302A and the second block 302B. This may be, for example, when a sub-block on one side of the boundary of samples 304A, 304B uses a different reference frame or has a significant difference in motion compared to a sub-block on the other side of the boundary of samples 304A, 304B.

In steps 410 and 412, filtering is applied. In step 410, a deblocking filter is first applied to the boundary of samples 304A, 304B in the first block 302A and/or the second block 302B. In some embodiments, the deblocking filter modifies at least G luma samples on a respective side of the boundary 306 between the first block 302A and the second block 302B. In step 412, the deblocking filter is applied to the boundary 306 between the first block 302A and the second block 302B. In some embodiments, the deblocking filter modifies at least F luma samples on the first block 302A side of the boundary 306 and at least F luma samples on the second block 302B side of the boundary 306.

In some embodiments, N is equal to 64, heightY is equal to 128, width Y is equal to 64, F is equal to 7, G is equal to 1, and M is equal to 4. In some embodiments, N is equal to 64, heightY is equal to 128, and width Y is equal to 32. In some embodiments, F is equal to 3 or 5 when the deblocking filter is a long deblocking filter. In some embodiments, F is equal to 2 when the deblocking filter is a weak filter. In some embodiments, G is equal to 2 or 3 and M is equal to 8.

In some embodiments, a longer deblocking filter is needed to combat blocking artefacts from large transform blocks and shorter deblocking filters such as the strong and weak filter in HEVC can handle blocking artefacts from smaller blocks. As an example, parallel-friendly deblocking may occur when M is equal to 8 and G is equal to 2 and F is equal to 5 using the weak filter of VVC (or the weak filter in HEVC, G equal to 2) for deblocking (of the prediction boundary 8 samples from the transform boundary (M is equal to 8) and using the long filter in VVC for deblocking of the transform boundary (with F equal to 5).

According to embodiments, where q0 represents the sample closest to the boundary in block Q and p0 represents the sample closest to the boundary in block P, p0' and q0' represents samples filtered by deblocking, it may be provided as follow:

Weak filtering (modifying at most 2+2 samples, G equal to 2):

$$\Delta = (9 * (q_0 - p_0) - 3 * (q_1 - p_1) + 8) >> 4$$

When $\mathrm{Abs}(\Delta)$ is less than $t_C * 10$, the following ordered steps can apply:
The filtered sample values $p_0'$ and $q_0'$ are as follows:

$$\Delta = \mathrm{Clip3}(-t_C, t_C, \Delta)$$
$$p_0' = \mathrm{Clip1}_Y(p_0 + \Delta)$$
$$q_0' = \mathrm{Clip1}_Y(q_0 - \Delta)$$

When dEp is equal to 1, the filtered sample value $p_1'$ is as follows:

$$\Delta p = \mathrm{Clip3}(-(t_C >> 1), t_C >> 1, (((p_2 + p_0 + 1) >> 1) - p_1 + \Delta) >> 1)$$
$$p_1' = \mathrm{Clip1}_Y(p_1 + \Delta p)$$

When dEq is equal to 1, the filtered sample value $q_1'$ is as follows:

$$\Delta q = \mathrm{Clip3}(-(t_C >> 1), t_C >> 1, (((q_2 + q_0 + 1) >> 1) - q_1 - \Delta) >> 1)$$
$$q_1' = \mathrm{Clip1}_Y(q_1 + \Delta q)$$

Long filter in VVC (where the number of samples that are modified, maxFilterLengthP and maxFilterLengthQ, can be 5, F equal to 5):
The filtered sample values $p_i'$ and $q_i'$ with i=0 ... maxFilterLengthP−1 and j=0 ... maxFilterLengthQ−1 are derived as follows:

$$p_1' = \mathrm{Clip3}(p_i - (t_C' *t_C' PD_i) >> 1, p_i(t_C' *t_C' PD_i +) >> 1,$$
$$(\mathrm{refMiddle} * f_i + \mathrm{refP} * (64 - f_i) + 32) >> 6)$$
$$q_j' = \mathrm{Clip3}(q_j - (t_C * t_C QD_j) >> 1, q_j + (t_C * t_C QD_j) >> 1,$$
$$(\mathrm{refMiddle} * g_j + \mathrm{refQ} * (64 - g_j) + 32) >> 6)$$

where
If maxFilterLengthP is equal to maxFilterLengthQ and maxFilterLengthP is equal to 5, the following applies:

$$\mathrm{refMiddle} = (p_4 + p_3 + 2 * (p_2 + p_1 + p_0 + q_0 + q_1 + q_2) + q_3 + q_4 + 8) >> 4$$

The variables refP and refQ can be derived as follows:

$$\mathrm{refP} = (p_{maxFilterLengthP} + p_{maxFilterLengthP-1} + 1) >> 1$$
$$\mathrm{refQ} = (p_{maxFilterLengthQ} + p_{maxFilterLengthQ-1} + 1) >> 1$$

In certain embodiments, parallel filtering is used such that the weak filter reads at most 3 consecutive samples on each side of the prediction boundary when G is equal to 2 (p0 to p2 and q0 to q2) a nd modifies at most two consecutive samples on each side, and the long filter reads at most 6 consecutive samples on each side of the transform block boundary when F is equal to 5 (p0 to p5 and q0 to q5) and modifies at most 5 consecutive samples on each side. Thus, the weak filter with G equal to 2 and the long filter with F equal to 5 will not use samples that have been modified by the other filter since the distance between the transform block boundary and the prediction block boundary is equal to 8 (M is equal to 8) . . . .

According to some embodiments, process 400 includes a further step in which the decoder determines whether the first block 302A or the second block 302B uses intra prediction. In some embodiments, heightY is smaller than or equal to 2*N.

Figure 5:
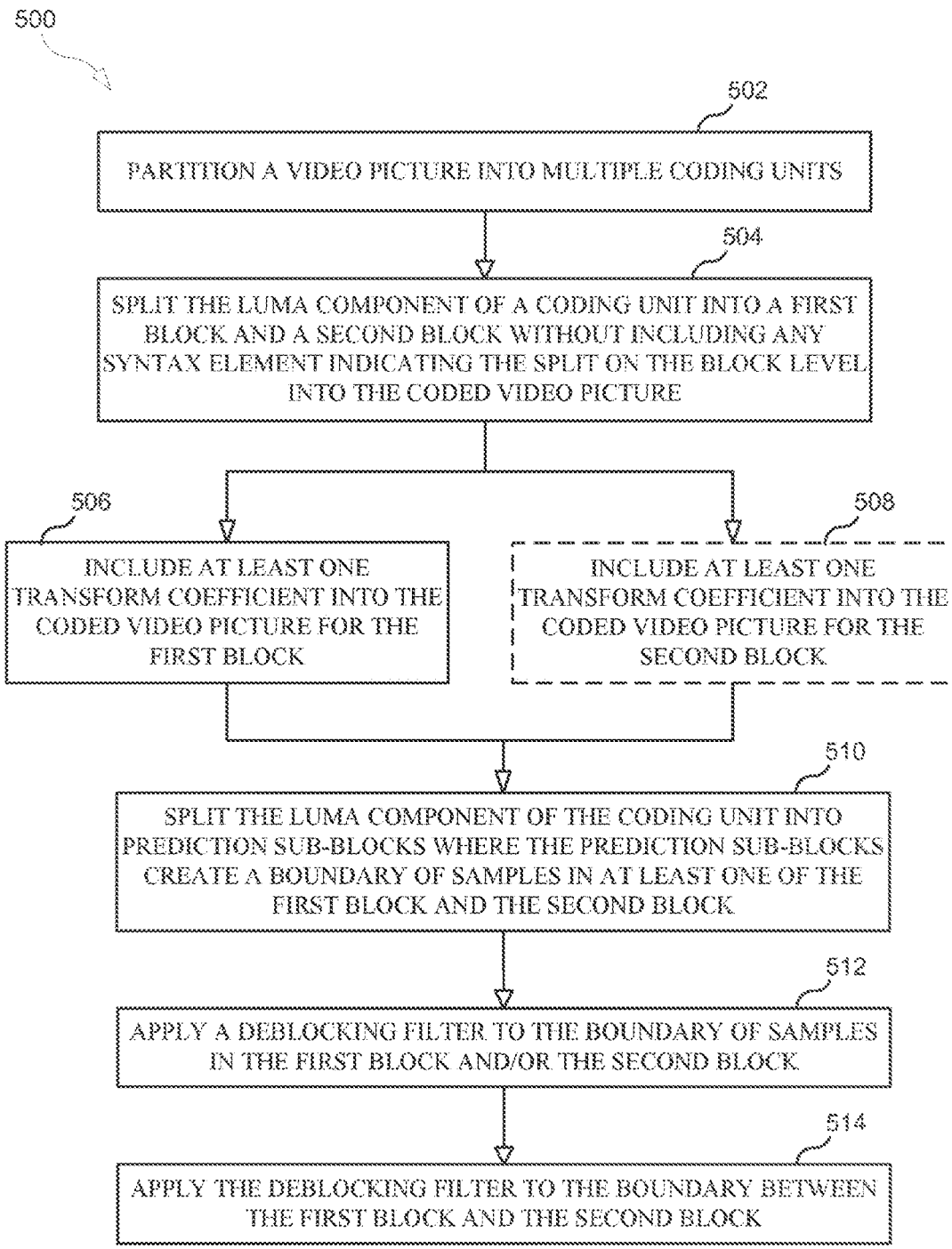
FIG. 5 is a flow chart illustrating a process according to one embodiment.
Figure 6:
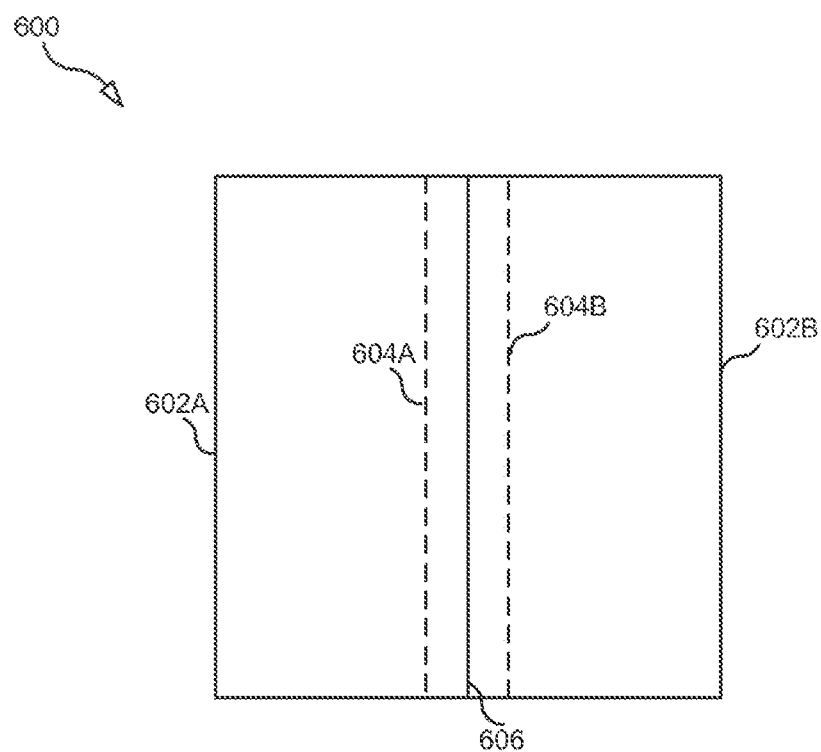
FIG. 6 illustrates a coding unit according to one embodiment.

FIG. 5 is a flow chart illustrating an encoding process 500 with one or more implicit splits for a luma component according to some embodiments. The encoding process 500 may be performed by an encoder and will be described with reference to the coding unit shown in FIG. 3. As with process 400, process 500 may be applied to one or more chroma components as well. Additionally, the one or more splits may be either vertical or horizontal, as shown with respect to FIGS. 3 and 6. FIG. 6 illustrates a coding unit 600 according to some embodiments. In some embodiments, a video picture is partitioned into multiple coding units (CUs) including the coding unit 600.

Referring now to FIG. 5, the encoding process 500 for encoding a video picture where a maximum size is set equal to the value N may begin with step 502, in which the encoder partitions the video picture into multiple coding units (CUs), including the coding unit 300. In some embodiments, the coding unit 300 has a size of heightY luma samples vertically and width Y luma samples horizontally. In some embodiments, the heightY is larger than N and the widthY is equal to or smaller than N. Coding unit may also be the unit 600 shown in FIG. 6. That is, the steps of process 500 may be applied where the heightY is equal to or smaller than N, but width Y is greater than N. Although process 500 is discussed with respect to a vertical split, it is also applicable to use of horizontal splits where dictated by relative height, width, and maximums.

In step 504, the luma component of the coding unit 300 is split into a first block 302A and a second block 302B without including any syntax element indicating the split on the block level into the coded video picture. In some embodiments, each of the first block 302A and the second block 304B comprises Z luma samples vertically and width Y luma samples horizontally where Z equals the heightY divided by two.

In step 506, at least one transform coefficient is included into the coded video picture for the first block 302A. In additional or alternative step 508, at least one transform coefficient is included into the coded picture for the second block 302B.

In step 510, the luma component of the CU 300 is split into prediction sub-blocks where the prediction sub-blocks create a boundary of samples 304A, 304B in at least one of the first block 302A and the second block 302B. In some embodiments, the boundary of samples 304A, 304B inside the first block 302 and/or the second block 302B is located M samples from the boundary 306 between the first block 302A, and the second block 302B when a sub-block on one side of the boundary of samples 304A, 304B uses a different reference frame or has a significant difference in motion compared to a sub-block on the other side of the boundary of samples 304A, 304B. The sub-blocks may also be as illustrated with respect to the corresponding elements of FIG. 6.

In step 512, a deblocking filter is applied to the boundary of samples 304A, 304B in the first block 302A and/or the second block 302B. In some embodiments, the deblocking filter modifies at least G luma samples on a respective side of the boundary 306 between the first block 302A and the second block 302B.

In step 514, the deblocking filter is applied to the boundary 306 between the first block 302A and the second block 302B. In some embodiments, the deblocking filter modifies at least F luma samples on the first block 302A side of the boundary 306 and at least F luma samples on the second block 302B side of the boundary 306.

In some embodiments, N is equal to 64, heightY is equal to 128, width Y is equal to 64, F is equal to 7, G is equal to 1, and M is equal to 4. In some embodiments, N is equal to 64, heightY is equal to 128, and width Y is equal to 32. In some embodiments, F is equal to 3 or 5 when the deblocking filter is a long deblocking filter. In some embodiments, F is equal to 2 when the deblocking filter is a weak filter. In some embodiments, G is equal to 2 or 3 and M is equal to 8.

In some embodiments, process 500 includes a further step in which the decoder determines whether the first block 302A or the second block 302B uses intra prediction. In some embodiments, heightY is smaller than or equal to 2*N.

Figure 7:
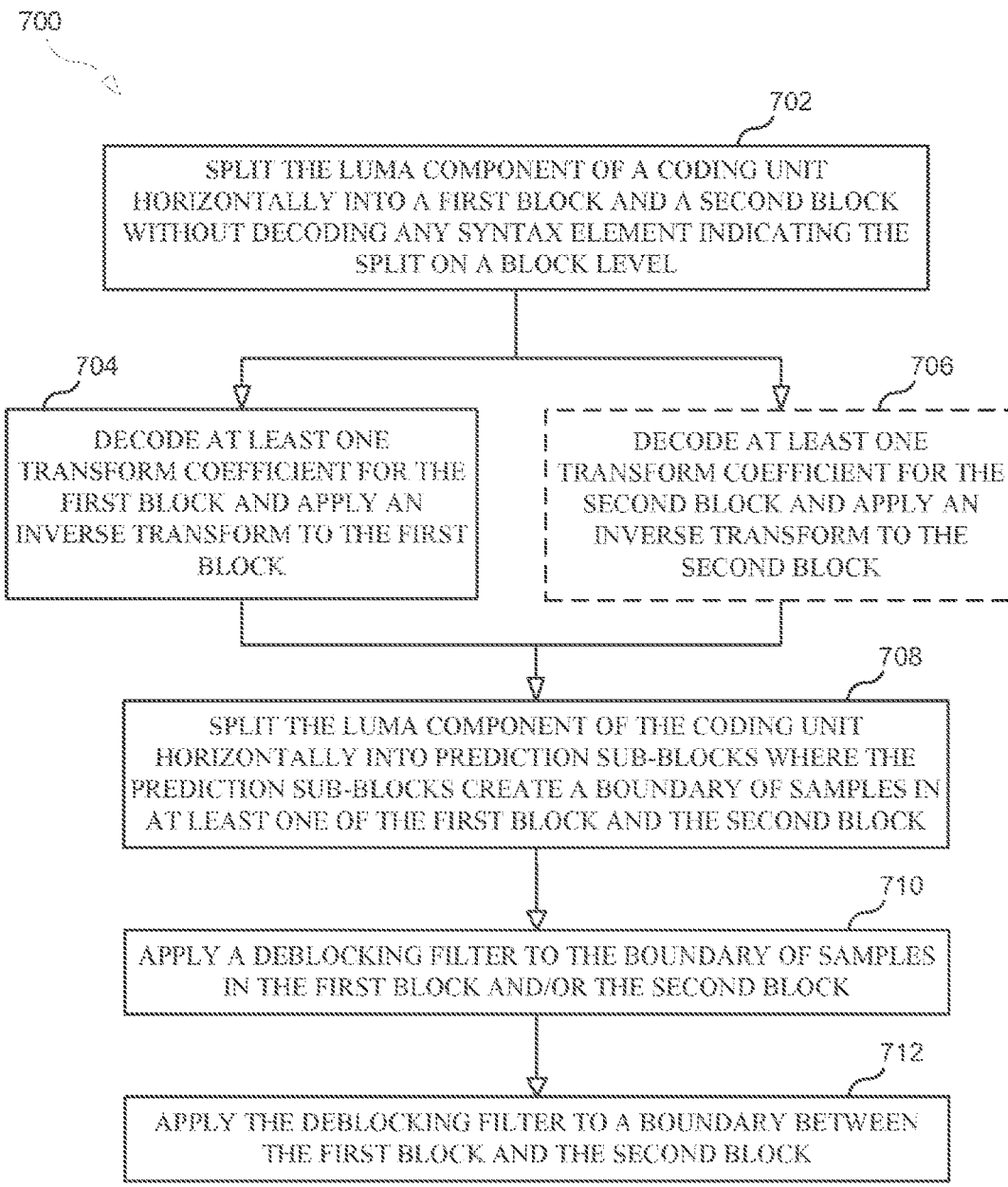
FIG. 7 is a flow chart illustrating a process according to one embodiment.

FIG. 7 is a flow chart illustrating a decoding process 700 with a horizontal implicit split according to some embodiments. The process may be, for instance, for a luma component. Though illustrated with respect to the luma component, process 700 may be applied to one or more chroma components. The decoding process 700 may be performed by a decoder and will be described with reference to the coding unit 600 shown in FIG. 6. In some embodiments, a maximum size for a coding unit in the video picture is set equal to an integer value N. The coding unit 600 has a size of heightY luma samples vertically and widthY luma samples horizontally. In some embodiments, heightY is equal to or smaller than N; widthY may be greater than N.

The decoding process 700 for decoding the video picture partitioned into multiple CUs may begin with step 702, in which the luma component of CU 600 is split horizontally into a first block 602A and a second block 604B. This may be, for instance, without decoding any syntax element indicating the split on the block level. In some embodiments, each of the first block 602A and the second block 602B comprises Z luma samples horizontally and heightY luma samples vertically, where Z equals the widthY divided by two.

In step 704, at least one coefficient is decoded for the first block 602A and an inverse transform is subsequently applied to the first block 602A. In additional or alternative step 706, at least one transform coefficient is decoded for the second block 602B and an inverse transform is subsequently applied to the second block 602B.

In step 708, the luma component of the CU 600 is split horizontally into prediction sub-blocks where the prediction sub-blocks create a boundary of samples 604A, 604B in at least one of the first block 602A and the second block 602B. In some embodiments, the boundary of samples 604A, 604B inside the first block 602 and/or the second block 602B is located M samples from the boundary 606 between the first block 602A and the second block 602B. This may be, for instance, when a sub-block on one side of the boundary of samples 604A, 604B uses a different reference frame or has a significant difference in motion compared to a sub-block on the other side of the boundary of samples 604A, 604B.

In step 710, a deblocking filter is first applied to the boundary of samples 604A, 604B in the first block 602A and/or the second block 602B. In some embodiments, the deblocking filter modifies at least G luma samples on a respective side of the boundary 606 between the first block 602A and the second block 602B.

In step 712, the deblocking filter is applied to the boundary 606 between the first block 602A and the second block 602B. In some embodiments, the deblocking filter modifies at least F luma samples on the first block 602A side of the boundary 606 and at least F luma samples on the second block 602B side of the boundary 606.

In some embodiments, N is equal to 64, width Y is equal to 128, heightY is equal to 64, F is equal to 7, G is equal to 1, and M is equal to 4. In some embodiments, N is equal to 64, width Y is equal to 128, and heightY is equal to 32. In some embodiments, F is equal to 3 or 5 when the deblocking filter is a long deblocking filter. In some embodiments, F is equal to 2 when the deblocking filter is a weak filter. In some embodiments, G is equal to 2 or 3 and M is equal to 8.

In some embodiments, process 700 includes a further step in which the decoder determines whether the first block 602A or the second block 602B uses intra prediction. In some embodiments, width Y is smaller than or equal to 2*N.

FIGS. 8A and 8B illustrate pseudo code directed to implementing the embodiments disclosed herein. The code of FIG. 8A may continue to the code of FIG. 8B. In VVC, the maximum CU size is 128×128 and the max TU size is 64×64. The maximum size N is therefore equal to 64 according to some embodiments and the example code. When the CU size is 128×128 and there are some transform coefficients to decode, the CU is divided into four non-overlapping 64×64 implicit TUs by an implicit split. A CU can be split into rectangular blocks such that the CU size before any implicit split is equal to 128×N or N×128 where N for example is 4, 8, 16, 32, 64. The CU is then implicitly split into two 64×N TUs or two N×64 TUs when there are transform coefficients in the CU. The CU can also be split into prediction sub-blocks of size 4×4 which create a boundary (e.g., boundary 304A, 304B shown in FIG. 3 and boundary 604A, 604B shown in FIG. 6) where a sub-block on one side of the boundary uses a different reference frame or has a significant difference in motion compared to the sub-block on the other side of the boundary.

The pseudo code shown in FIGS. 8A and 8B illustrate possible changes to VVC to ensure that the boundary (e.g., boundary 304A, 304B shown in FIG. 3 and boundary 604A, 604B shown in FIG. 6) from prediction sub-blocks with difference in reference frame or significant difference in motion on the respective side of the boundary in a first block (e.g., 302A of FIGS. 3 and 602A of FIG. 6) and a second block (e.g., 302B of FIGS. 3 and 602B of FIG. 6) are deblocked first by a deblocking filter and then the boundaries (e.g., 306 of FIG. 3 and 606 of FIG. 6) between the first block and the second block resulting from the implicit split may be deblocked by the deblocking filter when at least one of the first block and the second block has non-zero transform coefficients. In some embodiments, the sub-blocks come from one of the ATMVP and the STMVP tools as described in JVET-G1001.

As shown in FIGS. 8A and 8B, iEdgeOffset is expressed in units of 4 samples. In some embodiments, edgeDir is either a horizontal boundary (EDGE_HOR) or a vertical boundary (EDGE_VER) and cu is the current CU.

In some embodiments, VVC only uses HEVC filters and decisions. In some embodiments, longer filters and decisions may be used, and especially for large blocks when the texture is smooth. According to some embodiments, a long filter may be applied to a transform boundary where there are a sufficient number of samples between to the transform boundary and any sub-block boundaries. In some embodiments, a shorter filter may be applied at the sub-block boundary, e.g., only 2 or 3 samples. This may ensure that the respective filtering operations do not interfere.

In some embodiments, an alternative approach to deblocking of sub-block boundaries from sub-block prediction after the transform stage is to apply the deblocking at the prediction stage, e.g. before the transform stage. Accordingly, an improved prediction quality can be used to reduce the overhead for signalling quantized transform coefficients to the decoder. In such embodiments, deblocking is applied on the sub-block prediction boundaries where neighbouring sub-blocks have difference in reference frames or significantly different motion.

Deblocking can be performed first for vertical boundaries and then for horizontal boundaries to reduce discontinuities in both directions. In certain aspects, there is no filtering of the samples outside the CU. In some embodiments, the filter strength for the deblocking is controlled by block QP. In some embodiments, a variant of this approach is to use the predicted QP instead of the block QP for deblocking of sub-block prediction boundaries.

Figure 9A:
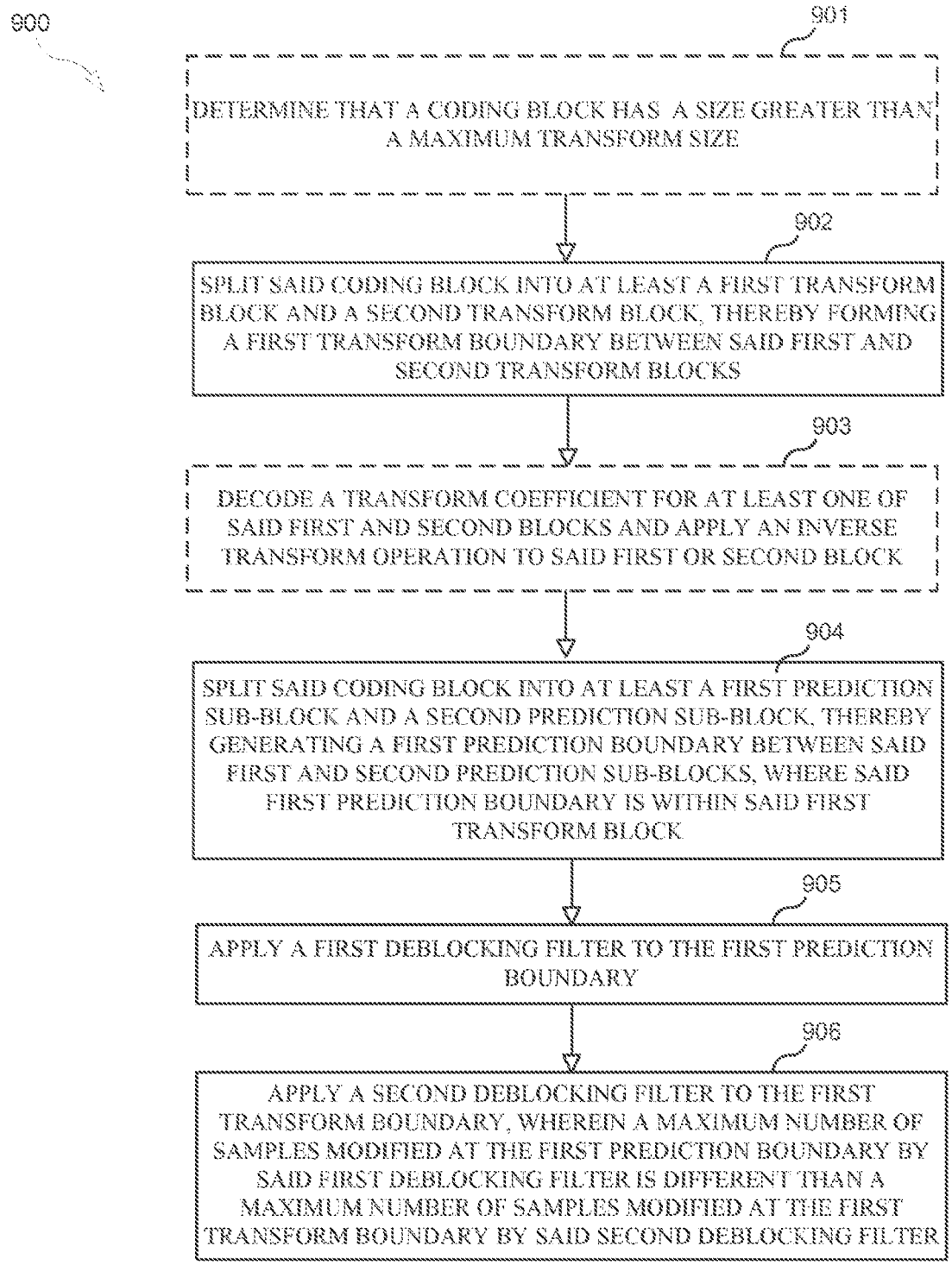
FIGS. 9A and 9B are flow charts illustrating processes according to some embodiments.
Figure 9B:
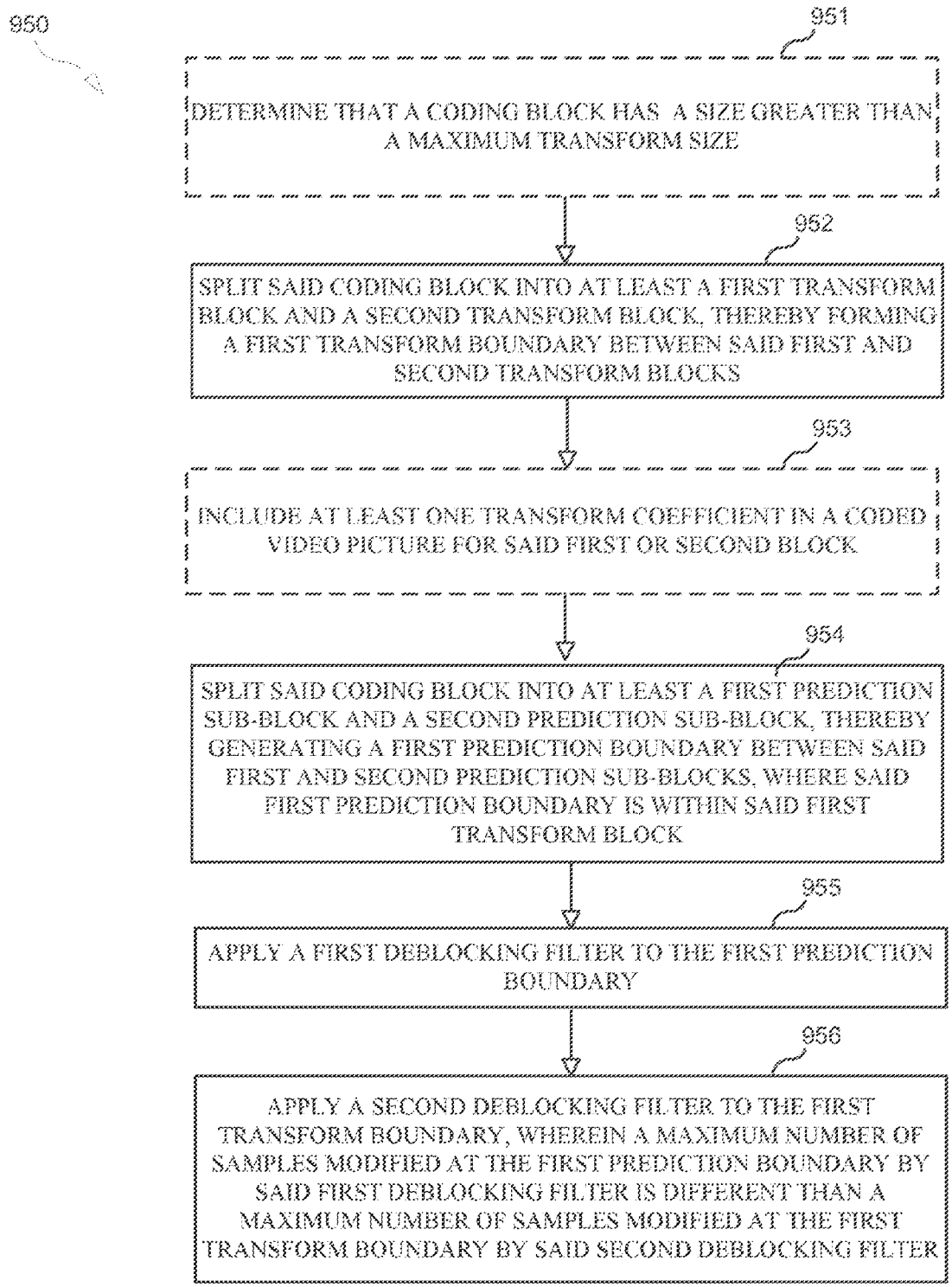
Figure 10:
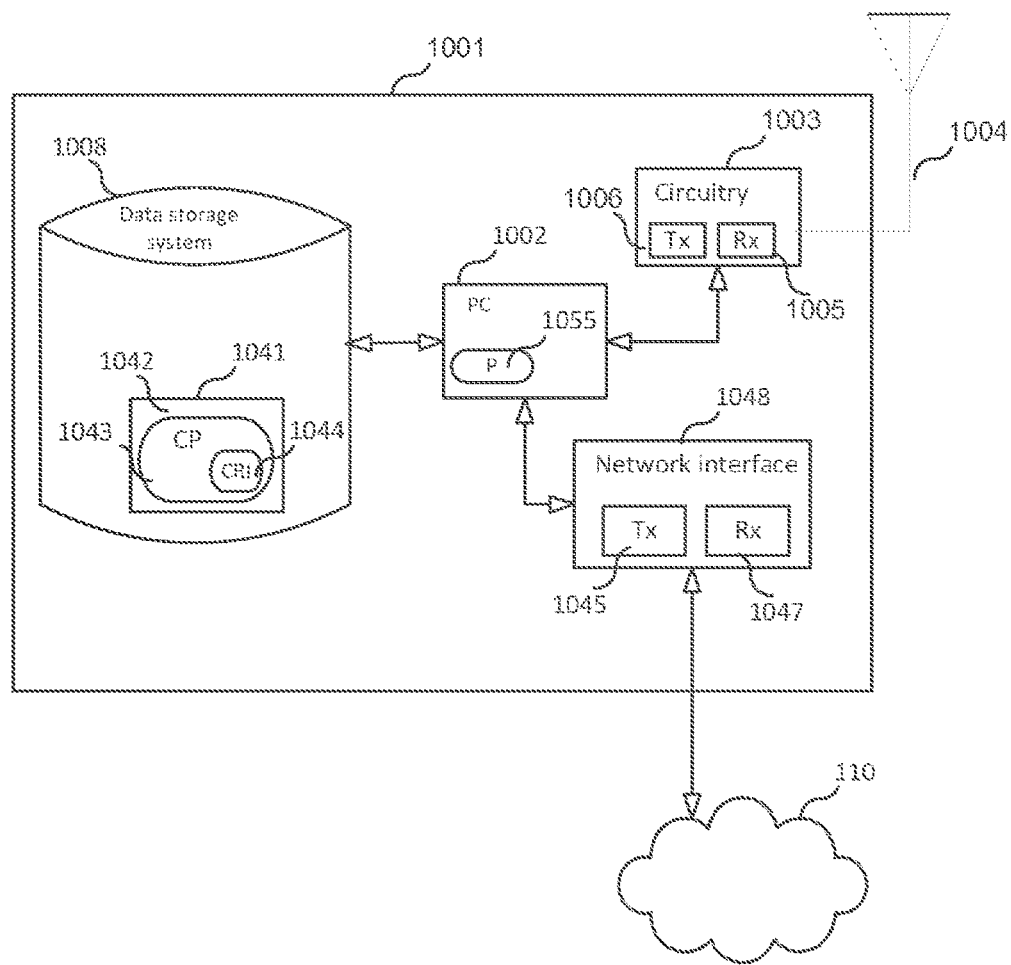
FIG. 10 is a block diagram of an encoder according to one embodiment.
Figure 11:
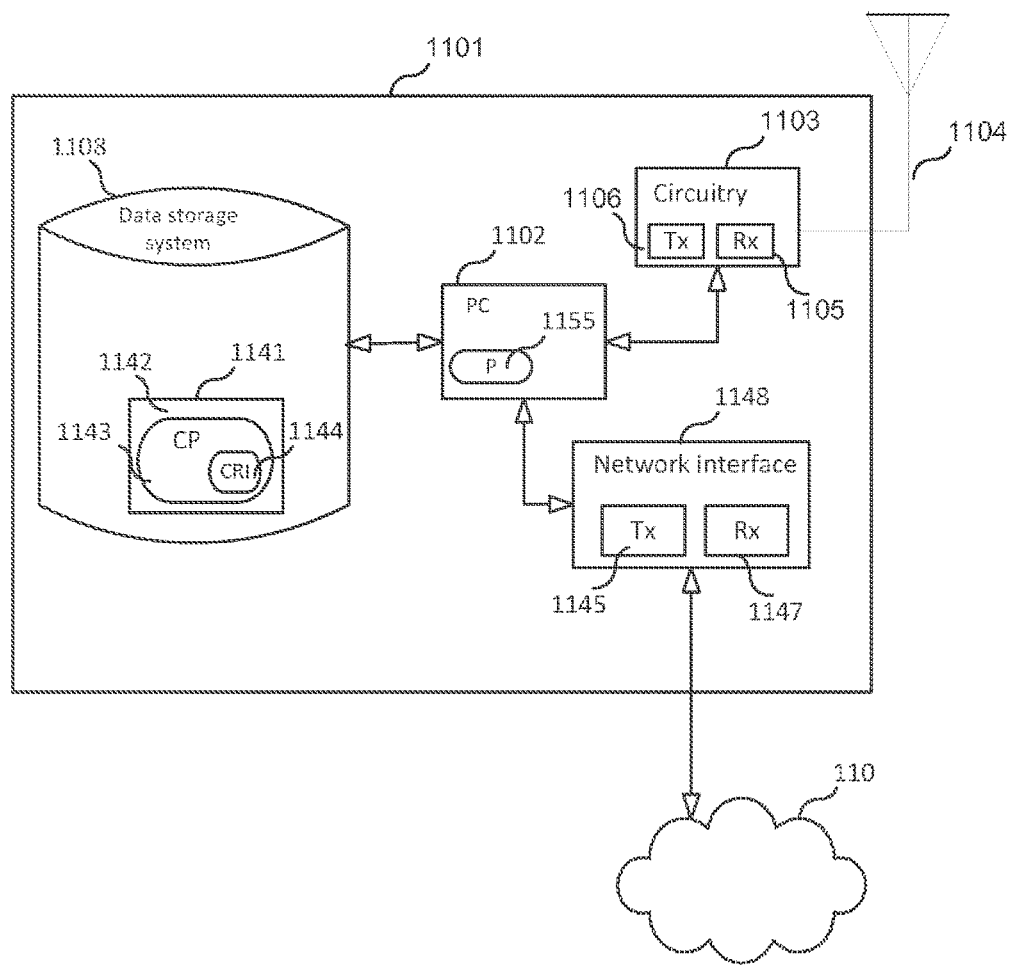
FIG. 11 is a block diagram of a decoder according to one embodiment.

Referring now to FIGS. 9A and 9B methods for encoding and decoding are provided. According to embodiments, they may be performed, for instance, by an encoder (1001) and/or decoder (1101) as illustrated in FIGS. 10 and 11, respectively. Similarly, a single device may comprise both encoding and decoding functionality, and perform one or more of the processes of FIGS. 9A and 9B.

Referring now to FIG. 9A, a process 900 for decoding a video picture partitioned into one or more coding blocks is shown according to some embodiments.

In optional step 901, the process 900 may begin with determining that the coding block has a size greater than maximum transform size.

In step 902, an implicit split is performed. For instance, for a coding block of the video picture having a size greater than a maximum transform size N, the step may comprise splitting the coding block into at least a first transform block and a second transform block, thereby forming a first transform boundary between the first and second transform blocks.

In optional step 903, the decoder performs a transform operation. For instance, it may decode a transform coefficient for at least one of the first and second blocks, and apply an inverse transform operation to the first or second block.

In step 904, a second split is performed. According to embodiments, step 904 comprises splitting a portion of the coding block into a first prediction sub-block and a second prediction sub-block, thereby generating a first prediction boundary between the first and second prediction sub-blocks, and wherein the first prediction boundary is within the first transform block.

In steps 905 and 906, filtering is applied. For instance, in 905, a first deblocking filter is applied to the first prediction boundary, and in step 906, a second deblocking filter is applied to the first transform boundary. According to embodiments, a maximum number of samples modified at the first prediction boundary by the first deblocking filter is different than a maximum number of samples modified at the first transform boundary by the second deblocking filter.

Referring now to FIG. 9B, a process 950 for encoding a video picture partitioned into one or more coding blocks is shown according to some embodiments.

In optional step 951, the process 900 may begin with determining that the coding block has a size greater than maximum transform size.

In step 952, an implicit split is performed. For instance, for a coding block of the video picture having a size greater than a maximum transform size N, the step may comprise splitting the coding block into at least a first transform block and a second transform block, thereby forming a first transform boundary between the first and second transform blocks.

In optional step 953, the encoder performs a transform operation. For instance, it may include at least one transform coefficient in a coded video picture for the first or second block.

In step 954, a second split is performed. According to embodiments, step 954 comprises splitting a portion of the coding block into a first prediction sub-block and a second prediction sub-block, thereby generating a first prediction boundary between the first and second prediction sub-blocks, and wherein the first prediction boundary is within the first transform block.

In steps 955 and 956, filtering is applied. For instance, in 955, a first deblocking filter is applied to the first prediction boundary, and in step 956, a second deblocking filter is applied to the first transform boundary. According to embodiments, a maximum number of samples modified at the first prediction boundary by the first deblocking filter is different than a maximum number of samples modified at the first transform boundary by the second deblocking filter.

According to embodiments of process 900 and 950, the step of determining (901, 951) may include, for instance, obtaining the coding block of the video picture, wherein the coding block is of size D1×D2 or D2×D1, and determining that D1 is greater than N. Additionally, splitting the coding block into at least a first transform block and a second transform block can be based at least in part on the determining that D1 is greater than N. After the split, the first transform block is of size N×D2, D2×N, or N×N, and the second transform block is of size N×D2, D2×N, or N×N. In some embodiments, both the height and width may exceed the maximum size N. This may result, for example, in the generation of 4 transform blocks, such as is illustrated with respect to implicit split 202.

In some embodiments, a number of samples modified by the first deblocking filter is less than a number of samples modified by the second deblocking filter. For instance, where a distance between the first prediction boundary and the first transform boundary is 8 samples, the first deblocking filter modifies 2 samples between the boundaries, and the second deblocking filter modifies 5 samples between the boundaries. In this example, the first deblocking filter is a weak filter and the second debcloking filter is a long filter.

According to embodiments, the splitting steps of processes 900 and 950 may generate vertical and/or horizontal boundaries. In some embodiments, horizontal boundaries may be processed (e.g., filtered) at the same time, and vertical boundaries may be processed (e.g., filtered) at the same. For instance, where both of the first prediction boundary and the first transform boundary are vertical boundaries or both of the first prediction boundary and the first transform boundary are horizontal boundaries, the first and second deblocking filters can be applied in parallel. In some embodiments, additional prediction sub-blocks, and thus additional prediction boundaries, may be generated. Similarly, where the coding block is large, additional transform boundaries (e.g., second, third, and fourth boundaries) may be generated due to additional splits, as illustrated in FIG. 2.

In some embodiments, the deblocking filtering is applied to the prediction boundary (or boundaries) first, and then to the transform boundary (or boundaries).

In some embodiments, generating a first prediction boundary comprises splitting the first block into first and second prediction sub-blocks on either side of the first prediction boundary. This may be, for instance, when the first prediction sub-block uses a different reference frame or has a significant difference in motion than the second prediction sub-block.

The application of one or more filters, such as deblocking filters, can modify the samples on either side of a given boundary. For instance, and in accordance with some embodiments, applying the first deblocking filter modifies at least one sample on each side of the first prediction boundary, and applying the second deblocking filter modifies at least one sample on each side of the first transform boundary. According to some embodiments, a distance between a first prediction boundary and a first transform boundary is M, a number of samples modified by deblocking on either side of the first prediction boundary is G, and a number of samples modified by deblocking on either side of the transform boundary is F. In certain aspect, there may be a number of size and sample numbers that are suitable for a given filtering operation. Some examples include:

(i) N is equal to 64, the width D1 of the coding block is 128, the height D2 of the coding block is 128, M is equal to 8, G is equal to 2, and F is equal to 5; or
(ii) N is equal to 64, the height D2 is equal to 128, the width D1 is equal to 64, F is equal to seven, G is equal to one, and M is equal to four; or
(iii) N is equal to 64, the height D2 128, and the width D1 is equal to 32; or
(iv) F is equal to 3 or 5 and a long deblocking filter is applied; or
(v) F is equal to 2 and a weak deblocking filter is applied; or
(vi) G is equal to 2 or 3; or
(vii) M is equal to 8.

Referring to the first option, where M is equal to 8, having G set to 2 and F at 5 allows for parallel processing without interference. That is, if the space between the boundaries is only 8 samples deblocking filtering of the transform boundary modifies a distance of 5 samples from the transform boundary and deblocking filtering of the prediction boundary modifies a distance of 2 samples from the prediction boundary which leaves a sample un-modified that only is read by both filterings, to ensure proper operation.

FIG. 10 is a block diagram of an encoder 1001 according to some embodiments. As shown in FIG. 10, encoder 1001 may comprise: a processing circuit (PC) 1002, which may include one or more processors (P) 1055 (e.g., a general purpose microprocessor and/or one or more other processors, such as an application specific integrated circuit (ASIC), field-programmable gate arrays (FPGAs), and the like); a network interface 1048 comprising a transmitter (Tx) 1045 and a receiver (Rx) 1047 for enabling encoder 1001 to transmit data to and receive data from other nodes connected to a network 110 (e.g., an Internet Protocol (IP) network) to which network interface 1048 is connected; circuitry 1003 (e.g., radio transceiver circuitry comprising an Rx 1005 and a Tx 1006) coupled to an antenna system 1004 for wireless communication with UEs); and local storage unit (a.k.a., "data storage system") 1008, which may include one or more non-volatile storage devices and/or one or more volatile storage devices (e.g., random access memory (RAM)). In embodiments where PC 1002 includes a programmable processor, a computer program product (CPP) 1041 may be provided. CPP 1041 includes a computer readable medium (CRM) 1042 storing a computer program (CP) 1043 comprising computer readable instructions (CRI) 1044. CRM 1042 may be a non-transitory computer readable medium, such as, but not limited, to magnetic media (e.g., a hard disk), optical media, memory devices (e.g., random access memory, flash memory), and the like. In some embodiments, the CRI 1044 of computer program 1043 is configured such that when executed by data processing apparatus 1002, the CRI causes encoder 1001 to perform steps described herein (e.g., steps described herein with reference to the flow charts). In other embodiments, encoder 1001 may be configured to perform steps described herein without the need for code. That is, for example, PC 1002 may consist merely of one or more ASICs. Hence, the features of the embodiments described herein may be implemented in hardware and/or software.

FIG. 11 is a block diagram of decoder 1101 according to some embodiments. As shown in FIG. 11, decoder 1101 may comprise: a processing circuit (PC) 1102, which may include one or more processors (P) 1155 (e.g., a general purpose microprocessor and/or one or more other processors, such as an application specific integrated circuit (ASIC), field-programmable gate arrays (FPGAs), and the like); a network interface 1148 comprising a transmitter (Tx) 1145 and a receiver (Rx) 1147 for enabling decoder 1101 to transmit data to and receive data from other nodes connected to a network 110 (e.g., an Internet Protocol (IP) network) to which network interface 1148 is connected; circuitry 1103 (e.g., radio transceiver circuitry comprising an Rx 1105 and a Tx 1106) coupled to an antenna system 1104 for wireless communication with UEs); and local storage unit (a.k.a., "data storage system") 1108, which may include one or more non-volatile storage devices and/or one or more volatile storage devices (e.g., random access memory (RAM)). In embodiments where PC 1102 includes a programmable processor, a computer program product (CPP) 1141 may be provided. CPP 1141 includes a computer readable medium (CRM) 1142 storing a computer program (CP) 1143 comprising computer readable instructions (CRI) 1144. CRM 1142 may be a non-transitory computer readable medium, such as, but not limited, to magnetic media (e.g., a hard disk), optical media, memory devices (e.g., random access memory, flash memory), and the like. In some embodiments, the CRI 1144 of computer program 1143 is configured such that when executed by data processing apparatus 1102, the CRI causes decoder 1101 to perform steps described herein (e.g., steps described herein with reference to the flow charts). In other embodiments, decoder 1101 may be configured to perform steps described herein without the need for code. That is, for example, PC 1102 may consist merely of one or more ASICs. Hence, the features of the embodiments described herein may be implemented in hardware and/or software.

Figure 12:
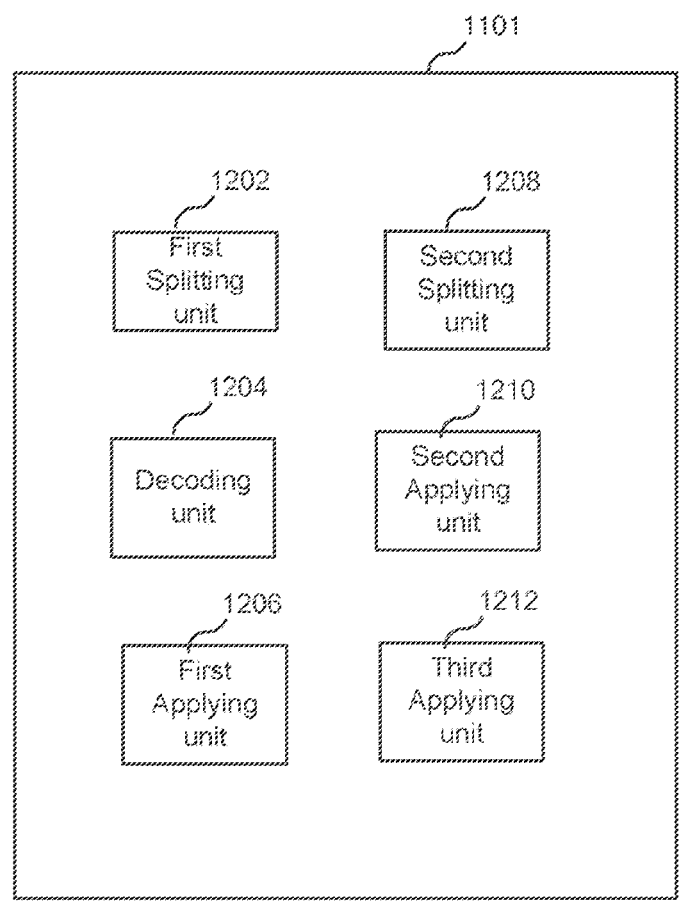
FIG. 12 is a diagram showing functional units of a decoder according to some embodiments.

FIG. 12 is a diagram showing functional units of decoder 1101 according to some embodiments. As shown in FIG. 12, decoder 1101 includes a first splitting unit 1202 for splitting components (e.g., luma components) of a coding unit into a first block and a second block without decoding any syntax element indicating the split on a block level; a decoding unit 1204 for decoding at least one transform coefficient for at least one of the first block and the second block; a first applying unit 1206 for applying an inverse transform to the at least one of the first block and the second block; a second splitting unit 1208 splitting the luma component of the coding unit into a plurality of prediction sub-blocks, wherein the plurality of prediction sub-blocks create a boundary in at least one of the first block and the second block; a second applying unit 1210 for applying a deblocking filter to the boundary in the at least one of the first block and the second block; and a third applying unit 1212 for applying the deblocking filter to a boundary between the first block and the second block.

In some embodiments, the step of splitting the luma component of the coding unit comprises vertically splitting the luma component. In some embodiments, the step of splitting the luma component of the coding unit comprises horizontally splitting the luma component.

Figure 13:
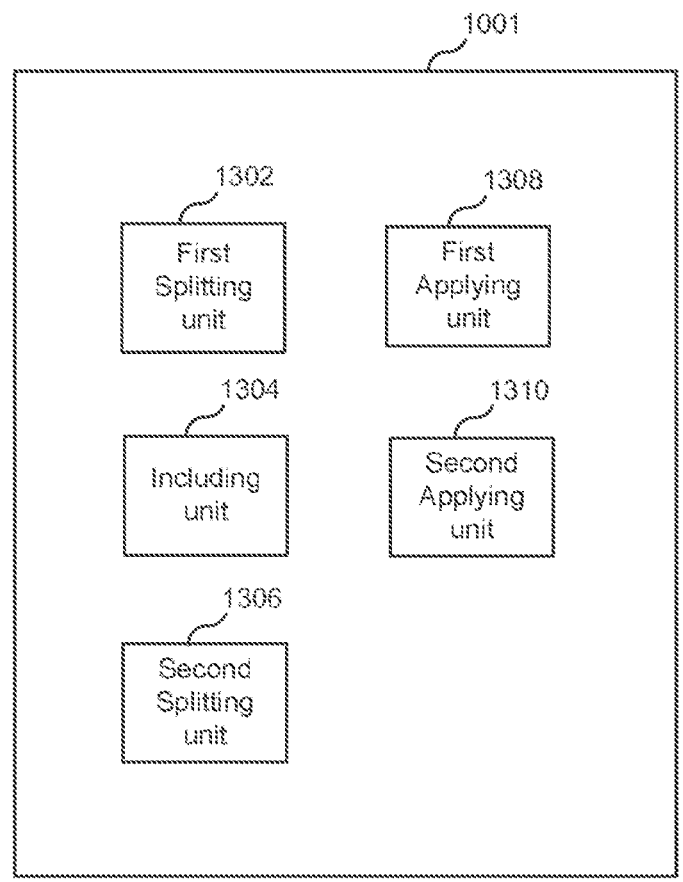
FIG. 13 is a diagram showing functional units of an encoder according to some embodiments.

FIG. 13 is a diagram showing functional units of encoder 1001 according to some embodiments. As shown in FIG. 13, encoder 1001 includes a first splitting unit 1302 for splitting components (e.g., luma components) of a coding unit into a first block and a second block without including any syntax element indicating the split on a block level into the encoded video picture; an including unit 1304 for including at least one transform coefficient into the encoded video picture for at least one of the first block and the second block; a second splitting unit 1306 for splitting the luma component of the coding unit into a plurality of prediction sub-blocks, wherein the plurality of prediction sub-blocks create a boundary in at least one of the first block and the second block; a first applying unit 1308 for applying a deblocking filter to the boundary in the at least one of the first block and the second block; and a second applying unit 1310 for applying the deblocking filter to a boundary between the first block and the second block.

Figure 14:
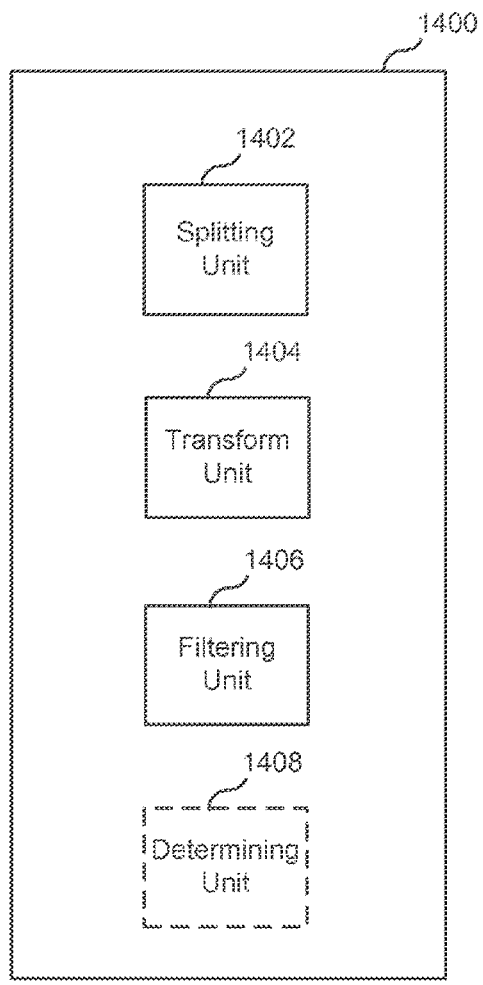
FIG. 14 is a diagram showing functional units of a video processing apparatus according to some embodiments.

FIG. 14 is a diagram of a video processing apparatus 1400 in accordance with one or more embodiments. As shown in FIG. 14, the video processor includes a splitting unit 1402, a transform unit 1404, and a filtering unit 1406. The splitting unit may be configured to, for a coding block of the video picture having a size greater than a maximum transform size N, split the coding block into at least a first transform block and a second transform block, thereby forming a first transform boundary between the first and second transform blocks. The splitting unit 1402 may also split a portion of the coding block into a first prediction sub-block and a second prediction sub-block, thereby generating a first prediction boundary between the first and second prediction sub-blocks, and wherein the first prediction boundary is within the first transform block. The filtering unit 1406 may be configured for applying a first deblocking filter to the first prediction boundary, and applying a second deblocking filter to the first transform boundary. The transform unit 1404 may perform one or more transform operations. For instance, where apparatus 1400 operates as a decoder, the transform unit 1404 may be configured for decoding a transform coefficient for at least one of the first and second blocks and applying an inverse transform operation to the first or second block. Where apparatus 1400 operates as an encoder, the transform unit 1404 may be configured for including at least one transform coefficient in a coded video picture for the first or second block. In some embodiments, apparatus 1400 further includes a determining unit 1408, which can determine if a coding unit is greater than a maximum size, such as a maximum transform size.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Further definitions are provided below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method for decoding a video picture, the method comprising:
splitting a luma component of a coding unit into a first block and a second block without decoding any syntax element indicating the split on a block level;
decoding at least one transform coefficient for at least one of the first block and the second block;
applying an inverse transform to the at least one of the first block and the second block;
splitting the luma component of the coding unit into a plurality of prediction sub-blocks, wherein the plurality of prediction sub-blocks create at least one boundary in at least one of the first block and the second block;
applying a first deblocking filter to a prediction boundary in at least one of the first block and the second block; and
applying a second deblocking filter to a boundary between the first block and the second block,
wherein a maximum number of samples modified by the first deblocking filter is different than a maximum number of samples modified by the second deblocking filter.

2. The method of claim 1, wherein splitting the luma component of the coding unit into prediction sub-blocks comprises vertically splitting the luma component.

3. The method of claim 1, wherein splitting the luma component of the coding unit into prediction sub-blocks comprises horizontally splitting the luma component.

4. The method of claim 1, further comprising:
determining that one or more of the first or second blocks implements intra prediction, and
wherein at least one of splitting the luma component of the coding unit into a plurality of prediction sub-blocks or applying at least one of the first or second deblocking filters is based on determining that intra prediction is implemented.

5. The method of claim 1, further comprising:
obtaining the coding unit of the video picture, wherein the coding unit is of size D1×D2 or D2×D1; and
determining that D1 is greater than N,
wherein splitting a luma component of the coding unit into a first block and a second block is based at least in part on determining that D1 is greater than N.

6. The method of claim 1, wherein splitting the luma component of the coding unit into a plurality of prediction sub-blocks comprises splitting the coding unit into first and second prediction sub-blocks on either side of the boundary.

7. The method of claim 6, wherein the first prediction sub-block uses a different reference frame or has a difference in motion than the second prediction sub-block.

8. A decoder adapted to:
split a luma component of a coding unit into a first block and a second block without decoding any syntax element indicating the split on a block level;
decode at least one transform coefficient for at least one of the first block and the second block;
apply an inverse transform to the at least one of the first block and the second block;
split the luma component of the coding unit into a plurality of prediction sub-blocks, wherein the plurality of prediction sub-blocks create at least one boundary in at least one of the first block and the second block;
apply a first deblocking filter to a prediction boundary in at least one of the first block and the second block; and
apply a second deblocking filter to a boundary between the first block and the second block,
wherein a maximum number of samples modified by the first deblocking filter is different than a maximum number of samples modified by the second deblocking filter.

9. A method for encoding a video picture, the method comprising:
splitting a luma component of a coding unit into a first block and a second block without including any syntax element indicating the split on a block level into the encoded video picture;
including at least one transform coefficient into the encoded video picture for at least one of the first block and the second block;
splitting the luma component of the coding unit into a plurality of prediction sub-blocks, wherein the plurality of prediction sub-blocks create at least one boundary in at least one of the first block and the second block;
applying a first deblocking filter to a prediction boundary in at least one of the first block and the second block; and
applying a second deblocking filter to a boundary between the first block and the second block,
wherein a maximum number of samples modified by the first deblocking filter is different than a maximum number of samples modified by the second deblocking filter.

10. The method of claim 9, wherein splitting the luma component of the coding unit into prediction sub-blocks comprises vertically splitting the luma component.

11. The method of claim 9, wherein splitting the luma component of the coding unit into prediction sub-blocks comprises horizontally splitting the luma component.

12. The method of claim 9, wherein first deblocking filter is a weak filter and said second deblocking filter is a long filter.

13. The method of claim 9, wherein applying the first deblocking filter is performed before applying the second deblocking filter.

14. The method of claim 9, wherein splitting the luma component of the coding unit into a plurality of prediction sub-blocks comprises splitting the coding unit into first and second prediction sub-blocks on either side of the boundary.

15. The method of claim 14, wherein the first prediction sub-block uses a different reference frame or has a difference in motion than the second prediction sub-block.

16. An encoder comprising a processor and a memory, wherein the processor is configured to perform the method of claim 9.

* * * * *